July 10, 1956 G. N. SMITH 2,753,759
VIEW INDICATOR FOR STEREO PROJECTOR
Filed April 13, 1953 3 Sheets-Sheet 1

INVENTOR.
GORDON N. SMITH
BY
Buckhorn and Cheatham
ATTORNEY

July 10, 1956 G. N. SMITH 2,753,759
VIEW INDICATOR FOR STEREO PROJECTOR
Filed April 13, 1953 3 Sheets-Sheet 2
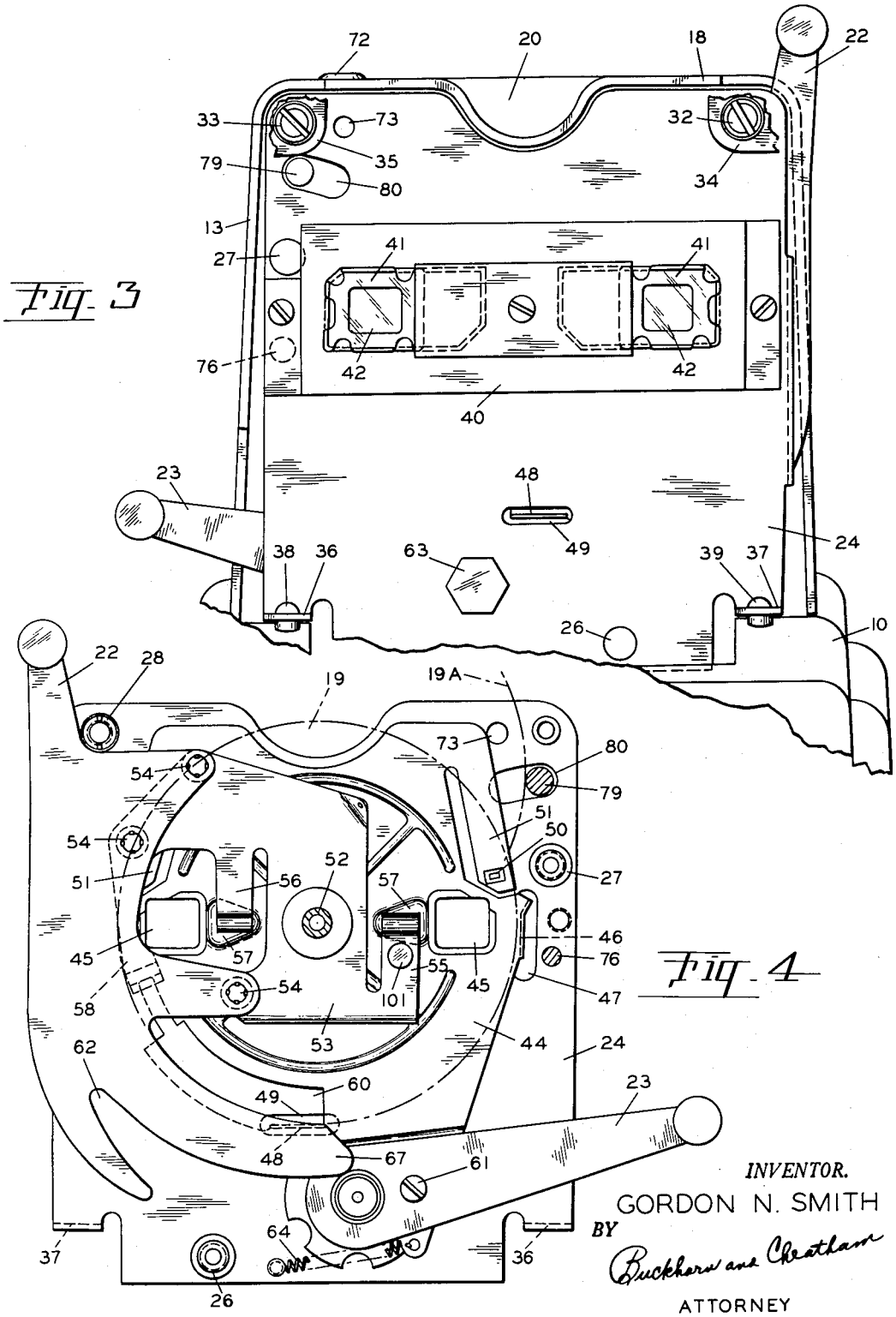
INVENTOR.
GORDON N. SMITH
BY
Buckhorn and Cheatham
ATTORNEY July 10, 1956 G. N. SMITH 2,753,759
VIEW INDICATOR FOR STEREO PROJECTOR
Filed April 13, 1953 3 Sheets-Sheet 3
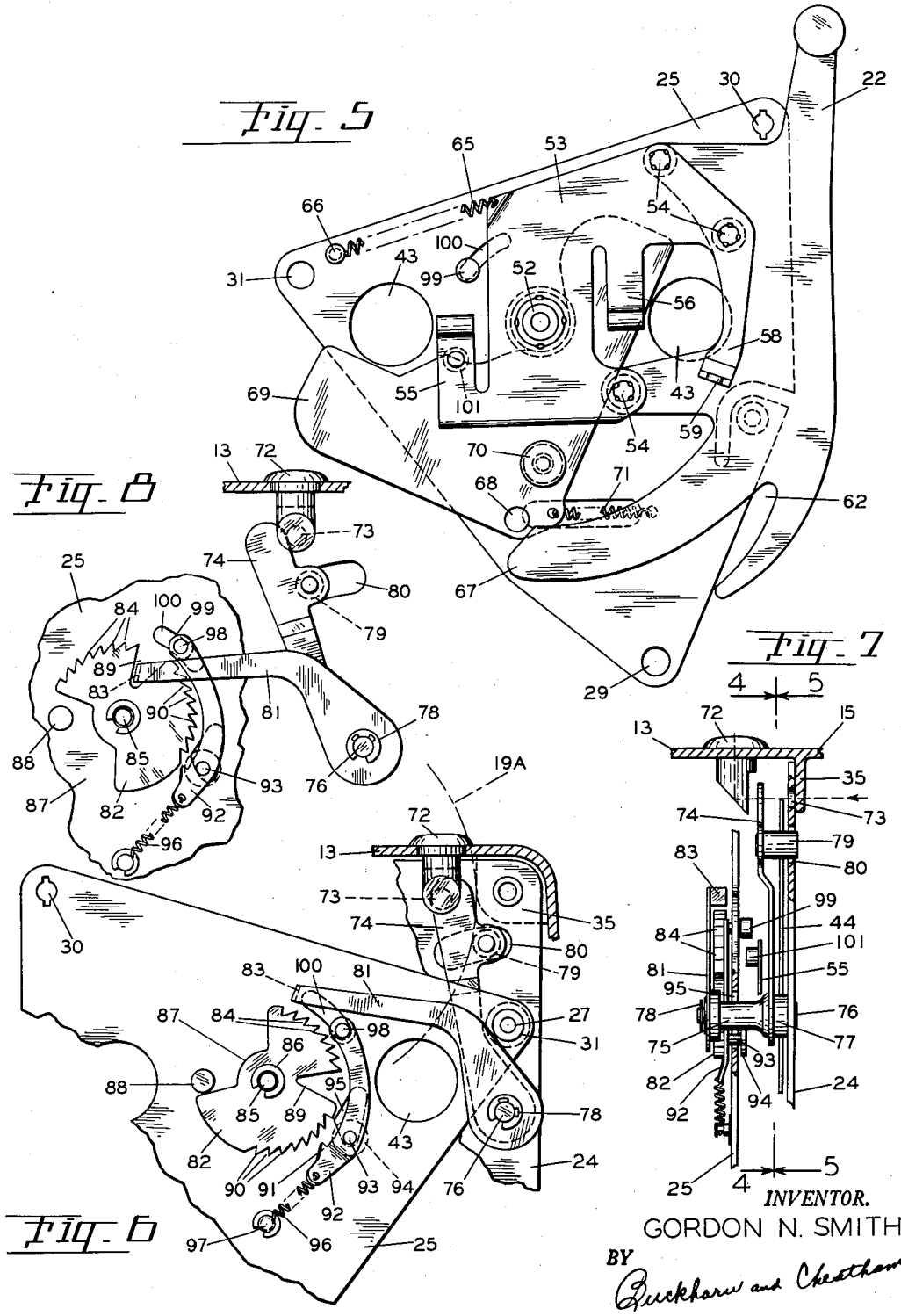
INVENTOR.
GORDON N. SMITH
BY
Buckhorn and Cheatham
ATTORNEY

United States Patent Office 2,753,759
Patented July 10, 1956

2,753,759

VIEW INDICATOR FOR STEREO PROJECTOR

Gordon N. Smith, Portland, Oreg., assignor to Sawyer's Inc., Portland, Oreg., a corporation of Oregon Application April 13, 1953, Serial No. 348,315

4 Claims. (Cl. 88—27)

My present invention comprises a view indicator for a projector, the invention having particular utility in a stereoscopic projector such as illustrated, described and claimed in my copending application, Serial No. 330,618, filed January 12, 1953. The invention is also of utility in other types of projectors, such as the projector for projecting single views of stereo-paired transparencies illustrated, described and claimed in my prior Patent No. 2,625,078, issued January 13, 1953. The invention is also of utility in any other type of projector designed interchangeably to receive transparency holders each having a plurality of transparencies mounted thereon and successively project the images thereof onto a viewing screen, provided each transparency holder mounts a predetermined number of transparencies. A holder of the type specified, for which the projector illustrated and described in the present application is specifically designed, comprises a disc holder having seven pairs of stereo-paired transparencies mounted concentrically thereon, such a holder being illustrated, described and claimed in the patent to Kurz, No. 2,571,584, issued October 16, 1951. Only so much of the projector as is necessary for an understanding of the present invention is herein illustrated and described, other details thereof being fully disclosed in the above-identified copending application.

The principal object of the present invention is to provide means for signaling to the operator the projection of the last scene of a series of scenes mounted in a single transparency holder, in order that the operator may know when it is time to replace the transparency holder. This is particularly important when the views are being projected to illustrate a lecture. By means of the present invention the operator is aware, from the time he begins showing the last of a series of views from a single transparency holder, of the fact that the holder must be replaced by the next holder of a series, and may be preparing for this event while lecturing upon the last view. This is of particular importance when utilizing a projector employing disc holders wherein it is possible to repeat the series of scenes merely by continuing to operate the feeding mechanism of the projector.

A further object of the present invention is to provide a device of the character described wherein the signaling means comprises an indicator button of translucent material which is illuminated from within the projector when the last scene of a series is being projected, thereby providing visual indicating means which will not distract the attention of the audience.

A further object of the present invention is to provide a device of the foregoing character which is automatically reset to a starting position upon replacing the transparency holder.

A further object of the present invention is to provide a device of the character described which comprises a simple mechanism embodying a minimum number of parts, and which may be supplied as an optional extra mechanism in the basic projector.

The foregoing and other objects and advantages of the present invention will be more readily apparent from inspection of the accompanying drawings taken in connection with the following specification and in which like numerals refer to like parts throughout.

In the drawings,

Fig. 3 is a rear elevation of the transparency holder receiving and feeding mechanism of the basic projector as modified for incorporation of the present invention;

Fig. 4 is a vertical section through the projector mechanism, taken substantially along the line 4—4 of Fig. 7 and looking toward the rear of the projector;

Fig. 5 is a vertical section through the projector mechanism, taken substantially along the line 5—5 of Fig. 7 and looking toward the front of the projector;

Fig. 6 is a view of a partial section through the projector taken substantially along the line 6—6 of Fig. 1 and looking toward the rear of the projector;

Fig. 7 is a side view of Fig. 6; and

Fig. 8 is a partial view corresponding to Fig. 6 and showing the mechanism in a signalling position.

Figure 1:
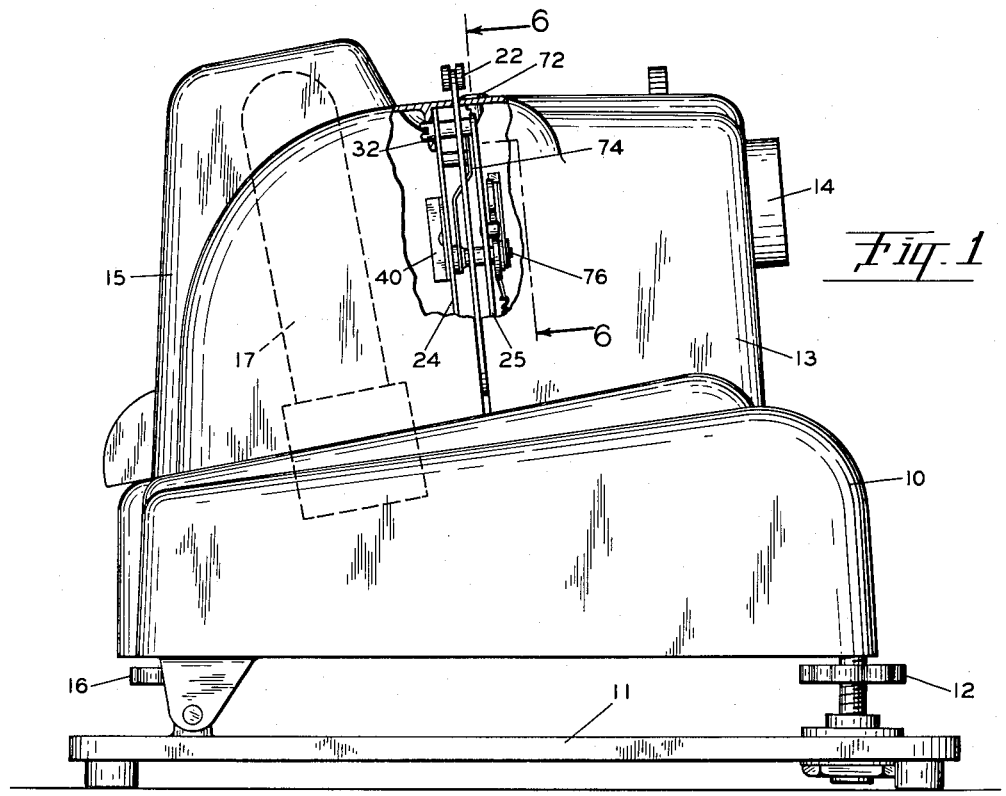
Fig. 1 is a side elevation, with parts broken away and nonessential parts eliminated, illustrating the relation of the indicating mechanism with respect to the projector.
Figure 2:
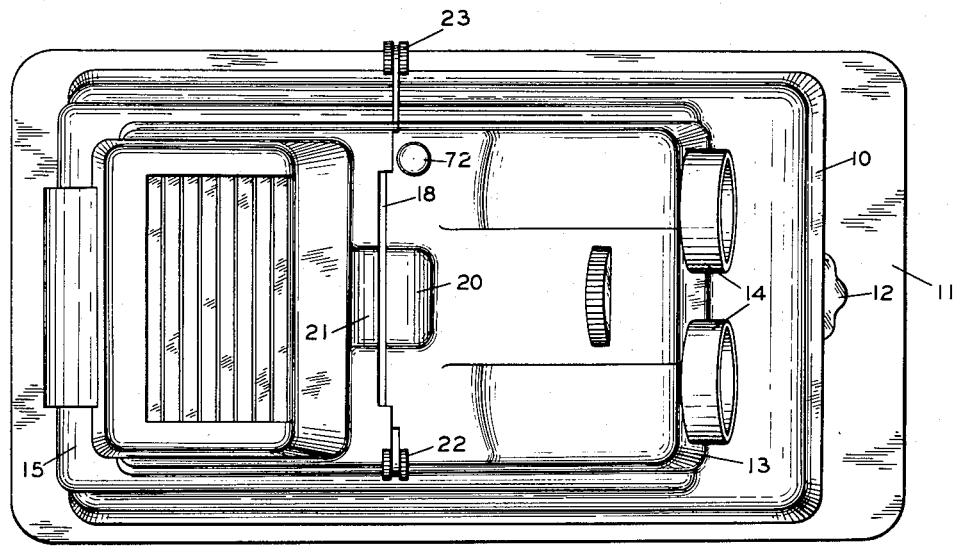
Fig. 2 is a plan view of the projector shown in Fig. 1.

The projector herein illustrated comprises a lower housing portion 10 pivotally mounted at its rear end upon a base 11, the front portion thereof being supported upon the base by means of an adjustment device 12 whereby the projected images may be adjusted vertically with respect to the viewing screen. An integral upper portion 13 supports a horizontally spaced pair of lens mechanisms, the forward ends of which are indicated at 14. A rear, upper housing portion 15 is detachably secured in complementary relation to the portions 10 and 13 to provide a complete housing by means including a screwhead 16. Means (not shown) are provided within the housing portion 15 to direct parallel light beams of equal intensity through transparencies mounted in a holder and inserted in the projector, the light being created by an incandescent bulb indicated at 17. The meeting rear edge of the portion 13, and the forward, vertical edge of the housing portion 15 are suitably formed at the top of the projector to provide a transverse slot 18 through which disc holders of the type illustrated in the above-mentioned patent to Kurz may be inserted. The holder, as indicated at 19 in broken outline (Fig. 4), is of such diameter that when it is fully seated in the projector in proper position for projecting, an upper portion thereof will project above the bottom of a recess in the top of the projector provided by complementary depressions 20 and 21 in the tops of the housing portions 13 and 15, respectively, whereby the holders may be grasped to withdraw them from the projector. The holders, as fully illustrated and described in the above-identified copending application, are maintained in a viewing plane, and each stereo-pair of transparencies is successively presented to proper position for projection by means including a feeding lever 22 projecting through a slot in the right side of the housing defined by the meeting edges of the upper housing parts. Relative adjustment of the vertical relationship of the right- and left-hand images of each pair is achieved by an adjusting lever 23 projecting through a slot in the left side of the projector defined by the meeting edges of the upper housing parts.

The means for receiving and maintaining the view-holder in the projection plane, and for successively stepwise rotating the holder to present views to the projecting position, comprise a rear mounting plate 24 of substantially rectangular outline and a front mounting plate 25 of substantially triangular outline, the latter being mounted upon the former and held in spaced parallel relation thereto by means including a plurality of spacers indicated at 26, 27 and 28. The spacers have reduced, forward ends for reception in openings 29, 30 and 31, respectively, in the front mounting plate, whereby the plates are maintained in proper relation to each other. The means for holding the plates in assembled relation include a pair of screws 32 and 33 having cylindrical heads which project toward the rear and are received in openings in a pair of lugs 34 and 35, respectively, on the housing portion 15. The plate 24 is also provided with a pair of apertured tabs which are bent rearwardly to provide locating feet 36 and 37, which engage rounded pins 38 and 39, respectively, on the housing portion 10. The mounting plates and the mechanism associated therewith may therefore be removably mounted in the housing, and are accurately and firmly maintained in proper relation to the projecting mechanism.

A filter holder 40 is mounted upon the rear surface of the rear mounting plate 24 and is provided with a horizontally spaced pair of openings in which are maintained a pair of polarizing filters 41 whereby the parallel beams of light are polarized, one in one sense and the other in another sense, in order that spectators viewing the screen through correspondingly polarized spectacles may sense the three-dimensional effect. The rear mounting plate 24 is provided with a pair of windows 42 through which light is transmitted to the transparencies. The front mounting plate 25 is also provided with a pair of windows 43 through which the polarized, image forming beams pass into the lens systems. The transparency holder is maintained against the front surface of the mounting plate 24 during projection by means including a movably mounted clamping plate 44, capable of limited movement toward and away from the plate 24, and also capable of slight rotational movement. The clamping plate is provided with a pair of windows 45 in alignment with the others. The clamping plate is provided with a pair of generally vertical flanges outwardly from the windows 45, one of which is indicated in Fig. 4 at 46, which project rearwardly through vertical slots 47 in the clamping plate to a sufficient distance that at all times, whether the clamping plate 44 is close to or removed from the mounting plate 24, the flanges 46 provide guides engageable with the lateral edges of the holder 19 to guide it into proper viewing position. The clamping plate is also provided with a horizontal flange 48 at its lower edge which likewise projects through a horizontal slot 49 on the mounting plate 24 to engage the lower edge of the inserted disc holder. The flanges 46 and 48 provide means defining the limits of a space into which the disc holder may be inserted and roughly located thereby for projection. Disc holders, as shown in the above-identified Kurz patent, are provided with a plurality of evenly spaced, concentrically arranged feeding apertures whereby suitable feeding mechanism may rotate the holder stepwise to present successive views to the windows. An opposed pair of such feeding apertures are engaged by locating lugs, one of which is shown at 50, at the extremities of a pair of resilient locating fingers 51 provided on the clamping plate. Preferably the clamping plate 44 is formed of resilient material, the fingers 51 are integral therewith and are prestressed so as to extend diagonally downward across the space into which the disc holder is inserted, and the locating lugs 50 are beveled so that the holder may force them aside, whereupon the resilient fingers will force the lugs into firm registry with the feeding apertures when presented thereto. The beveled lugs also do not interfere with the stepwise rotation of the disc holder. The clamping plate 44 is rotatably and slidably journaled upon a pivot 52 mounted upon and projecting rearwardly from the front triangular plate 25.

Stepwise feeding movement of the disc holder is accomplished through feeding means including the feeding lever 22 and described as follows: A spring plate 53 is fixed to the feeding lever by a plurality of spacer rivets 54, the lever and its attached spring plate being so formed as to be clear of the projection windows during projection. The spring plate is pivotally mounted upon the pivot 52, this providing the axis of pivotal movement for the lever 22. The spring plate is provided with a pair of oppositely projecting presser fingers 55 and 56, each of which is provided with a curved tip for engagement with a projection 57 on the surface of the clamping plate. The arrangement is such that when the ends of the fingers engage the projections 57 the clamping plate 44 is resiliently moved toward the mounting plate 24 to clamp an inserted disc holder in the proper projection plane, this relationship being illustrated in Fig. 4. Prior to the commencement of a feeding movement, however, the clamping plate is released by disengagement of the fingers from the projection 57, and the natural resiliency of the locating fingers 51 causes it to move away from the plate 24 whereby the feeding rotation of the disc holder is unopposed. A resilient feeding finger 58 is also provided by the spring plate 53, the finger terminating in a claw 59 engageable in the feeding apertures in the disc holder. The claw 59 projects through an arcuate slot 60 to effect feeding engagement with the disc holder. During a first portion of the downward feeding movement of the lever 22 the claw is retracted whereby feeding engagement cannot be effected until the presser fingers disengage the projections 57. Feeding movement of the lever 22 is limited whereby the feeding movement presents the feeding apertures adjacent the projected transparencies to the locating lugs 50.

The feeding movement of the lever 22 is arrested by a limiting lug 61 on the adjusting lever 23 engaging the bottom of a notch 62 on the feeding lever. The adjusting lever 23 is pivotally mounted on the plate 24 by means including a hexagonal head member 63, and carries an eccentric cam (not shown) engageable with a portion of the clamping plate 44 which is held thereagainst by a spring 64. The construction is such that movement of lever 23 upward or downward from a neutral position rotates the clamping plate 44 and the locating lugs 50 thereon about the pivot 52 whereby the vertical relation of the superimposed images on the screen may be adjusted. At the end of each feeding movement the limiting lug 61 is engaged in the notch 62 whereby the lever 23 is returned to a neutral position. The feeding lever 22 is urged toward its position of rest, when released, by a spring 65 biased between it and a pin 66 mounted on the plate 25.

In order that the beams of light may be cut off during feeding movements of the disc holder, a portion of the lever 22 indicated at 67 provides a cam which is engageable with a lug 68 on the shutter 69 which is pivotally mounted on a shutter pivot 70 fixed to the plate 25. When the lever 22 is returned to its position of rest, the portion 67 disengages the lug 68 so that the shutter is returned to an inoperative position by a shutter spring 71 biased between the shutter and a portion of the plate 25. In this position the spaced upper portions of the shutter 69 are maintained clear of the windows 43. However, immediately upon commencement of feeding movements of the lever 22 the shutter is pivoted so as to cover the windows 43, and the upper edge of the portion 67 continues to engage the lug 68 to maintain the shutter in obscuring position throughout the feeding movement.

The mechanism as so far described is more completely illustrated, described and claimed in the above-identified copending application. The indicator mechanism of the present invention comprises the following: A small opening is provided in the upper, rear surface of the casing portion 13 at the left-hand side thereof above the lever 23, and an indicator button of plastic, designated by the numeral 72, is fixedly mounted in the opening. The button is formed of a translucent, clear or colored, plastic, preferably of the type which has the property of directing light therethrough. The button comprises a stem which projects downwardly into the interior of the projector housing forwardly of the mounting plate 24 and directly above the upper edge of the mounting plate 25. The rear surface of the lower portion of the stem of the button is preferably shaped to provide a plane, light-collecting surface lying parallel to the mounting plates, and the forward surface of the stem of the button is cut off at an angle of 45° to provide a reflecting surface whereby a beam of light entering from the rear is directed upwardly through the indicator button, as shown by the dash line in Fig. 7. The upper, left-hand corner of the rectangular mounting plate 24 is provided with a light-transmitting opening 73 in alignment with the vertical rear surface of the indicator button stem whereby random light in the interior of the rear housing portion 15 created by the incandescent bulb 17 may be directed into the button to illuminate the upper surface thereof. Normally light is prevented from striking the indicator button by an indicator shutter comprising the blackened upper end of a lever 74 pivotally mounted on the plate 24. The pivotal mounting of the shutter lever is provided by fixing the lower end of the lever to an end face of a bushing 75 which is loosely and rotatably mounted on a spindle 76 fixed to the plate 24 and projecting forwardly therefrom beyond the adjacent edge of the triangular mounting plate 25, the spindle being provided with a spacer portion 77 to maintain the proper relationship of the lever. The bushing is loosely retained on the spindle by a snap ring 78. An intermediate portion of the shutter lever supports a longitudinally extending lug 79 which passes through an arcuate slot 80 in the rear mounting plate 24, the lug thus bridging an edge of the space into which the disc holder 19 is inserted. The lug 79 is so positioned that the right edge of a disc holder being inserted or removed engages the lug and throws the lever toward the right to cause the shutter to obscure the opening 73, the position of the reel being indicated at 19A when it effects this action.

The shutter is held in obscuring position until the last scene is projected by ratchet means as follows. The forward end of the bushing 75 has a ratchet latch lever 81 fixed thereto, the lever projecting upwardly so as to clear the adjacent window 43 during projection and then laterally so as to overhang a portion of a centrally mounted ratchet 82. As seen in Fig. 7 the lever is provided with an offset tab 83 which is engageable with teeth 84 on the ratchet, but which is held from engagement therewith by the transparency holder when in position at 19A and moving the shutter to obscuring position. As soon as the disc holder moves either upwardly or downwardly to sufficient extent, the tab 83 may drop into the notches between the teeth 84, this being due to the effect of gravity on the eccentrically disposed shutter lever 74 and latch lever 81. The ratchet is in the form of an interrupted disc and is freely rotatable about a pivot 85 projecting forwardly from the triangular mounting plate 25 coaxially with the pivot 52 of the feeding lever, being retained thereon by a snap ring 86. The ratchet 82 is provided with a wide notch 87 at its left side and a stop pin 88 projects forwardly from the plate 25 into the notch 87. The center of gravity of the ratchet is toward the right so that when the tab 83 is disengaged the ratchet is partially rotated by the force of gravity until the lower edge of the notch 87 engages the stop pin 88. This returning of the ratchet to a starting position occurs whenever a disc holder is removed, and is immediately followed by the tab 83 dropping into the first notch of the upper portion of the ratchet.

The teeth 84 constitute latching teeth and are the same in number as the number of stereo-paired transparencies on a holder. The last tooth thereof is succeeded by a deep notch 89, and the deep notch is succeeded by a plurality of ratchet feeding teeth 90. The teeth 90 are successively engaged by a claw 91 on a ratchet feeding dog 92. The lower end of the dog 92 is retained in position against the mounting plate 25 by a pin 93 affixed to the dog and having a large, flat head 94. The stem of the pin 93 passes through a somewhat triangular slot 95 in the plate 25, the lower right-hand edge of which slopes upwardly toward the teeth 90 on the ratchet 82 to provide a ramp for guiding the claw of the dog into feeding engagement with the ratchet. The lower end of the dog is apertured to receive one end of a dog returning spring 96, the opposite end of which is hooked about a pin 97 on the plate 25, the spring being directed toward the left and downward whereby the dog is normally retained with the pin 93 in the lower end of the slot 95 and the claw retracted from the ratchet, but upon upward movement of the dog the claw is moved into feeding engagement with the ratchet.

The dog is curved to lie alongside the ratchet and its upper end is provided with a pin 98 having an enlarged, cylindrical head 99, the stem of the pin passing through an arcuate slot 100 in the plate 25, the center of curvature of which coincides with the axis of rotation of the ratchet. The head 99 of the pin 98 projects into the arcuate path of a cylindrical lug 101 riveted to the finger 55 on the feeding lever spring plate 53, the lug 101 engaging the head 99 of the pin toward the end of the feeding stroke and moving the dog 92 upwardly a sufficient distance to rotate the ratchet 82 counterclockwise, as seen in Fig. 8, until the tab 83 drops into the space beyond the next tooth 84. In the particular embodiment of the invention there are seven teeth 84, corresponding to the seven stereo-paired transparencies mounted in the disc holder, so that at the end of the seventh feeding actuation of lever 22 the tab 83 drops into the deep notch 89 as seen in Fig. 8. The resulting movement of the shutter lever 74 is sufficient to uncover the light opening 73, thereby causing the indicator button 72 to be illuminated from within. The operator is thus forewarned to withdraw the disc holder and replace it with another. Upon withdrawing the holder its edge engages the lug 79, thus raising the tab 83 beyond the teeth 84 and permitting the ratchet to rotate clockwise under the influence of gravity until the pin 88 is engaged by the lower edge of the notch 87. It is to be appreciated that the disc holder may be provided with indicating means, such as a notch in its edge as shown in the above-identified Kurz patent, whereby the holder may be properly inserted in the first instance to position the first stereo-pair of a series in alignment with the windows through the successive plates.

It should be apparent from the foregoing that the edge of the holder engages the lug 79 and causes release of the ratchet when the new holder is inserted, as well as when the old holder is withdrawn. This action is of advantage in that it becomes almost impossible for the apparatus to function improperly. For example, should the tab 83 drop into one of the intermediate notches in the ratchet upon withdrawing a holder, due to some unforeseeable mischance, subsequent insertion of the new holder would certainly assure return of the mechanism to its starting position.

Having illustrated and described a preferred embodiment of my invention, it should be apparent to those skilled in the art that the same permits of modification in arrangement and detail whereby other signaling means may be actuated to achieve the same functions, or other types of transparency holders having a predetermined number of transparencies thereon may be utilized in a projector having similar indicating means thereon. I claim as my invention all such modifications as come within the scope of the following claims.

I claim:

1. In a projector adapted to receive, one at a time, holders mounting a plurality of transparencies, feeding means engageable with an inserted holder to displace the holder at each actuation thereof in order that images of the transparencies thereon may be successively projected, a signal effecting member mounted in said projector and movable from an inoperative position to an operative position, a ratchet and associated ratchet latching device mounted in said projector, said ratchet latching device being fixed to said signal effecting member and engaging said ratchet, ratchet moving means operatively engageable by said feeding means progressively to displace said ratchet in one direction, said ratchet having a recess thereon into which said ratchet latching device may move when said ratchet has been displaced a certain amount, means to effect movement of said latching device into said recess whereby said signal effecting member is moved to its operative position, a portion of said signal effecting member being disposed, when the signal effecting member is in its operative position, in the path of a holder being moved from or into the projector and engageable by the holder to return said signal effecting member to its initial position and raise said ratchet latching device from engagement with said ratchet, and means effective when said latching device is so raised to return said ratchet to its starting position, said portion being disposed in spaced relation from the disc holder when fully inserted into the projector whereby reengagement of said latching device with said ratchet occurs after said ratchet has returned to its starting position.

2. In a projector comprising a housing having an opening therethrough, means to receive a disc holder having a plurality of transparencies mounted thereon, and feeding means engageable with said holder to present the transparencies successively to a projecting position; a shutter pivotally mounted in the projector and normally blocking the passage of light through said opening, a ratchet rotatively mounted in said projector, means operatively associating said ratchet with said feeding means progressively to advance said ratchet upon each actuation of said feeding means, a ratchet latch fixed to said shutter, said ratchet latch overhanging said ratchet whereby said ratchet latch normally rests upon and engages said ratchet to retain it after advancement, said ratchet having a deep notch into which said ratchet latch may drop at the end of a predetermined number of advancing movements of the ratchet whereby said shutter is displaced to permit light to be transmitted through said opening, and means to raise said ratchet latch from engagement with said ratchet comprising a lug on said shutter engageable by the edge of a holder being withdrawn from or inserted into the projector, said ratchet being eccentrically weighted whereby said ratchet automatically returns to an initial position when said latch is raised, said lug being located in spaced relation from a disc holder when fully inserted whereby reengagement of said ratchet latch with said ratchet occurs after said ratchet has returned to its initial position.

3. In a projector adapted to receive, one at a time, holders mounting a plurality of transparencies, feeding means engageable with an inserted holder rotatively to displace the holder stepwise at each actuation thereof in order that images of the transparencies thereon may be successively projected, a signal effecting member mounted in said projector and movable from an inoperative position to an operative position, a ratchet and associated ratchet latching device mounted in said projector, said ratchet latching device being fixed to said signal effecting member and engaging said ratchet, ratchet moving means operatively engageable by said feeding means progressively to displace said ratchet in one direction, said ratchet having a recess thereon into which said ratchet latching device may move when said ratchet has been displaced a certain amount, means to effect movement of said latching device into said recess whereby said signal effecting member is moved to its operative position, means on said signal effecting member disposed, when the signal effecting member is in its operative position, in the path of a holder being moved from or into the projector and engageable by the holder to return temporarily said signal effecting member to its initial position and raise temporarily said ratchet latching device from engagement with said ratchet, and means effective when said latching device is so raised to return said ratchet to its starting position whereby after said ratchet has returned to its starting position said ratchet latching device will again engage said ratchet.

4. In a projector comprising a housing having an opening therethrough, means to receive a disc holder having a plurality of transparencies mounted thereon, and feeding means engageable with said holder to present the transparencies successively to a projecting position; a shutter pivotally mounted in the projector and normally blocking the passage of light through said opening, a ratchet rotatively mounted in said projector, means operatively associating said ratchet with said feeding means progressively to advance said ratchet upon each actuation of said feeding means, a ratchet latch fixed to said shutter, said ratchet latch overhanging said ratchet whereby said ratchet latch normally rests upon and engages said ratchet to retain it after advancement, said ratchet having a deep notch into which said ratchet latch may drop at the end of a predetermined number of advancing movements of the ratchet whereby said shutter is displaced to permit light to be transmitted through said opening, and means to raise temporarily said ratchet latch from engagement with said ratchet comprising a lug on said shutter engageable by the edge of a holder only while being withdrawn from or inserted into the projector, said ratchet being eccentrically weighted whereby said ratchet automatically returns to an initial position when said latch is raised, and said lug being spaced from the edge of a fully inserted holder whereby said ratchet latch will subsequently engage said ratchet.

References Cited in the file of this patent
UNITED STATES PATENTS

| Number | Name | Date |
|---|---|---|
| 1,325,825 | Bailey | Dec. 23, 1919 |
| 2,189,285 | Gruber | Feb. 6, 1940 |
| 2,229,848 | Harter et al. | Jan. 28, 1941 |
| 2,365,547 | Hausherr | Dec. 19, 1944 |
| 2,402,149 | Crumrine | June 18, 1946 |
| 2,511,334 | Gruber | June 13, 1950 |
| 2,525,598 | Gruber | Oct. 10, 1950 |
| 2,558,999 | Aldrich | July 3, 1951 |
| 2,571,584 | Kurz | Oct. 16, 1951 |
| 2,580,874 | Wottring | Jan. 1, 1952 |
| 2,598,573 | Lutes | May 27, 1952 |
| 2,625,078 | Smith | Jan. 13, 1953 |
| 2,653,511 | Correa | Sept. 29, 1953 |